INVENTOR
P. W. SMITH
ATTORNEY

United States Patent Office
3,551,844
Patented Dec. 29, 1970

1

3,551,844
RING-TYPE PARAMETRIC OSCILLATOR
Peter W. Smith, Little Silver, N.J., assignor to Bell Telephone Laboratories, Incorporated, Murray Hill, N.J., a corporation of New York
Filed June 18, 1968, Ser. No. 737,955
Int. Cl. H03f 7/00
U.S. Cl. 331—107                    5 Claims

ABSTRACT OF THE DISCLOSURE

A ring-type parametric oscillator includes a ring laser having an auxiliary ring resonator which contains a parametric crystal. The auxiliary resonator is made highly selective at the pump frequency and resonant at both the signal and idler frequencies. Unidirectional traveling wave propagation of all radiation prevents interference effects present in standing-wave configurations, and, together with simultaneous resonance of signal and idler, promotes high efficiency.

BACKGROUND OF THE INVENTION

This invention relates to parametric devices and more particularly to parametric oscillators employing ring-type configurations.

One of the major developments in the scientific world within the past decade has been the invention of the maser or laser which has made available to scientists and engineers for the first time a source of coherent electromagnetic radiation extending from microwave frequencies to the ultraviolet. From a technological standpoint, the real impact is yet to be fully realized.

While intense activity continues to be directed to the development and improvement of new masers and lasers, parallel development utilizing these new coherent sources and extending their frequency ranges have also received considerable attention. One class of devices utilizes the nonlinear characteristics of materials transparent to the energy of concern to generate or amplify coherent radiation of a frequency different from that of the energizing source. Illustrative publications include Review of Modern Physics 35, 23 (1963), reporting second harmonic generation and Physical Review 127, 1918 (1962), directed to parametric effects.

The use of parametric effects with electromagnetic waves is analyzed in an article by P. K. Tien entitled, "Parametric Amplifier and Frequency Mixing in Propagating Circuits," Journal of Applied Physics 29, 1347 (1958), in which it is shown that traveling wave interaction and hence traveling wave parametric amplification or oscillation are possible if certain $\omega$–$\beta$ conditions are satisfied, where $\omega$ represents angular frequency and $\beta$ represents propagation constant. These conditions are that $$\omega_{signal} + \omega_{idler} = \omega_{pump} \quad (1)$$

and $$\bar{\beta}_{signal} \quad \bar{\beta}_{idler} \quad \bar{\beta}_{pump} \quad (2)$$

Parametric effects have been observed in numerous nonlinear optic crystals including noncentrosymmetric birefringent negative uniaxial crystals such as KDP, as disclosed in U.S. Pat. 3,234,475 and isotropic nonbirefringent crystals such as GaP, as disclosed in U.S. Pat. 3,309,526. Optical media in which parametric oscillations or effects can be generated will hereinafter be termed "parametric media."

In addition to satisfying the aforementioned $\omega$–$\beta$ conditions, in order to achieve continuous wave (CW) parametric oscillations the intensity or power of the pump signal, typically generated by a laser oscillator, should exceed a certain threshold which may be different for different parametric media and device configurations. In accordance with the present invention several things are preferably done in order to increase efficiency and thereby effectively lower the threshold: (1) the pump laser is restricted essentially to single frequency-single longitudinal mode operation inasmuch as power at other pump frequencies not satisfying Equation 1 is wasted; (2) the parametric medium is located within the pump laser resonator where the medium experiences much higher pump intensity than is available outside the laser cavity. In contrast, in most prior art devices the parametric medium is located outside the pump laser cavity. The medium is generally not located inside the pump laser cavity in the prior art because of the use in the prior art of linear (not ring-type) standing wave resonators which produce both backward and forward traveling signal and idler signals which may be out of phase and tend to destructively interfere; (3) the pump laser utilizes a ring resonator to produce a unidirectional directional traveling wave which thereby eliminates the aforementioned destructive interference of signal and idler; and (4) the signal and idler are made to be simultaneously resonant in an auxiliary ring resonator.

SUMMARY OF THE INVENTION

In accordance with the present invention, a ring-type parametric oscillator comprises a primary ring resonator having an auxiliary ring resonator which contains a parametric medium. The auxiliary ring resonator is made highly selective at the pump frequency and resonant at both the signal and idler frequencies. In addition, in order to achieve single frequency pump radiation, the auxiliary ring resonator is coupled to a primary ring resonator through two independent beam splitting surfaces which are oriented to direct out of the laser all longitudinal modes that are not resonant in both resonators. For example, one will obliquely reflect out of the resonator the nonresonant, clockwise-propagating modes; and the other, the nonresonant counterclockwise-propagating modes.

BRIEF DESCRIPTION OF THE DRAWINGS

The invention, together with its various features and advantages can be easily understood with reference to the following more detailed description taken in conjunction with the accompanying drawings, in which.

DETAILED DESCRIPTION

Figure 1:
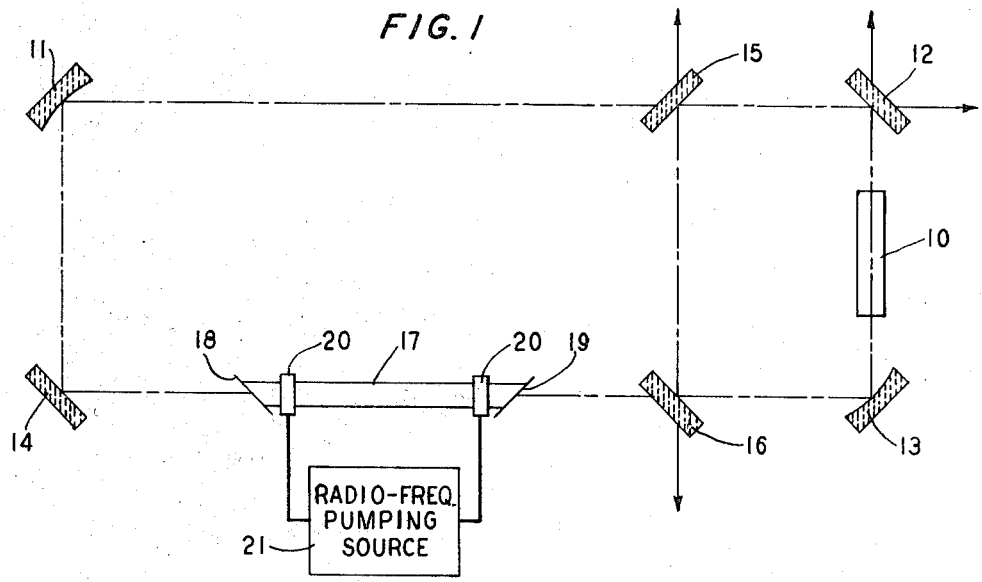
FIG. 1 is a schematic of an illustrative embodiment of the invention showing a parametric crystal located in the auxiliary ring resonator.

In the embodiment shown in FIG. 1, the focusing reflectors 11 and 13 and the planar reflectors 12 and 14 form the primary ring resonator. Disposed within the primary ring resonator is the active laser medium, illustratively a helium-neon mixture, contained in the tube 17 to generate pump radiation. The tube 17 has Brewster-angle end windows 18 and 19 and is encircled by the band-type electrodes 20 through which radio-frequency pumping energy is supplied by the source 21 in order to excite the gas mixture and produce amplification by stimulated emission of radiation.

It is to be understood, however, that the invention can be practiced with liquid or solid state media as well as with gaseous media of different compositions.

Furthermore, the excitation shown in the drawing can be of the direct-current type, if appropriate.

An auxiliary ring resonator is formed by the partially transmitting planar reflectors 15 and 16 in combination with reflectors 12 and 13. Inasmuch as the reflectors 15 and 16 are partially reflective as well as partially transmission and are oriented at oblique incidence with respect to the path of the radiation in the primary ring resonator, they may be termed beam splitters. It should be noted that they are independent in the sense that they need not be oriented at like angles with respect to the light propagation path in the primary ring resonator so long as they form a closed light propagation path within the auxiliary ring resonator, in cooperation with the reflectors 12 and 13. It will also be noted that all legs but one of the light propagation path in the auxiliary resonator coincide with portions of legs of the primary resonator.

Located in the auxiliary ring resonator, as between reflectors 12 and 13, is a parametric medium 10 which generates signal and idler frequencies when pump radiation passes threrethrough. In order to sustain the signal and idler the auxiliary ring is made to be resonant at the signal and idler frequencies. Toward this end, the reflectors 12 and 13 should be highly reflecting (e.g., 99%) at the signal, idler and pump frequencies, whereas the reflectors 15 and 16, while also preferably having high reflectivity at the signal and idler, need only be about 60% reflective at the pump frequency assuming a tube gain of about 10% and dimenisons appropriate for the 6328 A. neon transition.

The reflector 12 may illustratively be made partially transmissive in order to facilitate the abstraction of signal or idler output fromb the parametric oscillator; or, alternatively, the light transmitted through reflector 15 or 16 may be employed as an output. In some applications, outputs may be abstracted at all of these points.

SINGLE MODE PUMP OPERATION

As pointed out previously, it is advantageous from an efficiency standpoint to drive the parametric medium with single longitudinal mode pump radiation. In operation, the auxiliary resonator discriminates against unwanted longitudinal modes of the primary ring resonator. Specifically, the discrimination is effected by several principles of cooperation.

First, the free spectral range of the auxiliary resonator is larger than that of the primary ring resonator and preferably is also larger than the line width of the laser active medium which, for illustration, we have taken to be neon. The free spectral range of a resonator is the frequency spacing between adjacent resonant longitudinal modes of the resonator. Free spectral range is inversely related to the radiation path length in the resonator. The line width of the active medium is a frequency range throughout which oscillation can be maintained by means of appropriate tuning of the resonator. In brief, the auxiliary resonator will typically have only one resonant longitudinal mode at a frequency that is supportable both by the primary ring resonator and the active medium.

Second, the auxiliary ring resonator discriminates against modes not resonant in both resonators by reflecting any radiation occurring in such modes out of the laser at reflectors 15 and 16. A large percentage of such radiation is reflected out of the oscillator so that such modes do not build up in the resonators. Because these modes do not reach oscillation level, the radiation leaving the laser at reflectors 15 and 16 will largely consist of the desired mode that is resonant in both resonators, even though only a relatively small fraction of it is coupled out, as will be explained below.

It is the action of reflectors 15 and 16 in reflecting radiation in unwanted modes out of the oscillator while also helping to form the auxiliary ring resonator that gives the pump ring laser used in this invention high mode selectivity and great adaptability, as compared to the configurations of the prior art. The reflectivities of beam splitters 15 and 16 can be variously selected to give a laser mode selectivity anywhere in a relatively wide range.

It can readily be appreciated that selectivity among modes depends upon the ratio of loss for the selected mode (preferably low loss) to the loss for the unwanted modes (preferably high loss). The loss for the selected mode is kept very low by using high quality mirrors with small scattering and absorption losses. The auxiliary resonator, being resonant for the selected mode, builds up a very high internal light intensity in that mode which in the present invention is advantageous for exceeding the pump threshold for parametric oscillation. There isa comparably high light intensity in that mode in the remaining portion of the primary ring resonator.

Consider what happens if portions of this light coming from below beam splitter 15 and from the left of beam splitter 15 propagate out of the laser in the upward direction. The interference between these two waves of comparable intensity is destructive because of the 180 degree phase shift of the latter wave upon reflection from beam splitter 15 and greatly reduces the fraction of the energy of the selected mode that is directed out of the laser by the reflective surfaces of reflectors 15 and 16. Further, there are two reflectors providing such cooperation. Reflector 15 operates upon the modes propagating in the clockwise sense in the primary ring resonator to produce the high loss ratio, and the reflector 16 operates upon the modes propagating in the counterclockwise sense in the primary ring resonator to produce the high loss ratio. For good selectivity, the beam splitter reflectivities should be increased as the laser gain is increased.

In order to maximize the interference effects at the beam splitters, it is desirable that the wavefront curvature and size of the interfering beams be matched as closely as possible. Illustratively, the curvatures of reflectors 14 and 13 are selected with this objective in mind.

It should be apparent that other configurations could employ polygons other than quadrilaterals so long as a portion of the path length of the auxiliary ring resonator overlaps a portion of the path length of the primary ring resonator and there are at least two beam splitting surfaces coupling the auxiliary ring resonator to the primary ring resonator. These beam splitting surfaces should be oriented to direct out the laser modes that are not resonant in both resonators.

ALTERNATE EMBODIMENTS

Figure 2:
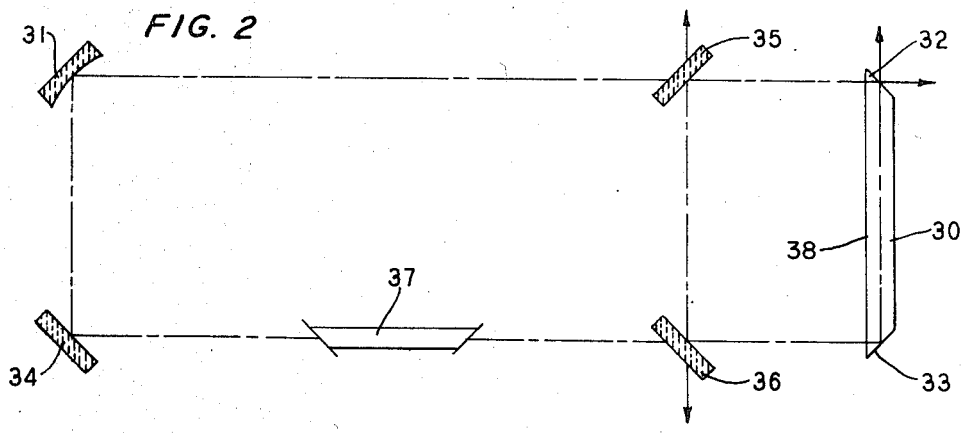
FIG. 2 is a schematic of a second illustrative embodiment of the invention showing a parametric crystal cut so as to form two of the reflectors of the auxiliary ring resonator.

In particular, as shown in FIG. 2, the reflectors 12 and 13 of FIG. 1 have been replaced by a parametric crystal 30 cut to form reflecting surfaces 32 and 33 which function in the same manner as reflectors 12 and 13. These surfaces are preferably coated so as to be highly reflecting at the signal, idler and pump frequencies. Deposited on the entrance surface 38 is an antireflection coating, not shown. The operation of the invention is the same as that previously described with respect to FIG. 1.

Figure 3:
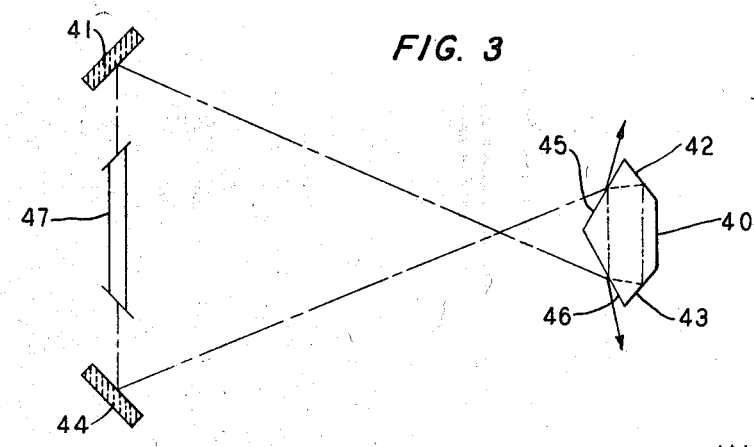
FIG. 3 is a schematic of another illustrative embodiment of the invention showing a parametric crystal cut so as to form all four reflectors of the auxiliary ring resonator.

In another embodiment as shown in FIG. 3, all of the reflectors forming the auxiliary ring resonator are formed on the surfaces of a parametric crystal 40 cut in such a manner that surfaces 42 and 43 correspond to reflectors 12 and 13 of FIG. 1 and surfaces 45 and 46 correspond to beam splitters 15 and 16 of FIG. 1. Again the surfaces 42 and 43 are coated to be highly reflective at signal, pump and idler frequencies. The surfaces 45 and 46 are also coated so as to be highly reflective at signal and idler frequencies, but need only be approximately 40 to 60% reflective at the pump frequency. Reflectors 41 and 44 are oriented so that pump energy generated by laser 47 is directed into crystal 40 in such a manner that the closed path of the auxiliary ring resonator lies wholly within the crystal 40. The crystal in turn has its cut surfaces so oriented that the primary ring resonator (formed by reflectors 41 and 44 and surfaces 42 and 43) is optically coupled to the auxiliary ring resonator (formed by surfaces 42, 43, 45 and 46).

What is claimed is:

1. A parametric oscillator comprising a ring laser including
   a primary ring resonator,
   an active laser medium disposed within said primary resonator to generate pump radiation,
   an auxiliary ring resonator optically coupled to said primary resonator, said auxiliary resonator being characterized by substantial mode selectivity for the pump radiation,
   a parametric medium disposed within said auxiliary resonator so as to generate signal and idler frequencies in response to the pump radiation,
   said auxiliary resonator being resonant at the signal and idler frequencies.

2. The parametric oscillator of claim 1 wherein said auxiliary ring resonator includes two independent beam splitting surfaces coupling said auxiliary ring resonator to said primary ring resonator, said beam splitting surfaces being oriented to direct out of said oscillator modes that are not resonant in both of said resonators.

3. The parametric oscillator of claim 2 wherein said beam splitting surfaces form a part of the surface of said parametric medium.

4. The parametric oscillator of claim 1 wherein said primary ring resonator comprises a plurality of reflecting surfaces forming a light propagation path essentially in the shape of a first closed polygon, and said auxiliary ring resonator comprises a second plurality of reflecting surfaces including said beam splitting surfaces and at least one of said first plurality of reflecting surfaces, the second plurality of reflecting surfaces forming a light propagation path essentially in the form of a second closed polygon having a plurality of sides that coincide with portions of the sides of the first closed polygon.

5. The parametric oscillator of claim 4 wherein said second plurality of reflecting surfaces form part of the surface of said parametric medium.

References Cited

UNITED STATES PATENTS 3,267,385  8/1966  Ashkin _____ 307—88.3
3,454,902  7/1969  Giordmaine _____ 307—88.3

JOHN KOMINSKI, Primary Examiner

D. R. HOSTETTER, Assistant Examiner

U.S. Cl. X.R.

307—88.3; 331—96